United States Patent
Chen et al.

(10) Patent No.: US 11,055,006 B1
(45) Date of Patent: Jul. 6, 2021

(54) VIRTUAL STORAGE DOMAIN FOR A CONTENT ADDRESSABLE SYSTEM

(71) Applicant: EMC IP Holding Company LLC, Hopkinton, MA (US)

(72) Inventors: Xiangping Chen, Sherborn, MA (US); Anton Kucherov, Milford, MA (US); Junping Zhao, Beijing (CN); Kevin Xu, Warren, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 460 days.

(21) Appl. No.: 15/797,324

(22) Filed: Oct. 30, 2017

(51) Int. Cl.
*G06F 3/06* (2006.01)

(52) U.S. Cl.
CPC .......... *G06F 3/0644* (2013.01); *G06F 3/0604* (2013.01); *G06F 3/0664* (2013.01); *G06F 3/0673* (2013.01)

(58) Field of Classification Search
CPC .... G06F 3/0644; G06F 3/0604; G06F 3/0664; G06F 3/0673
See application file for complete search history.

(56) References Cited

U.S. PATENT DOCUMENTS

| | | | | |
|---|---|---|---|---|
| 7,131,144 B2 * | 10/2006 | Rabin | .................. | G06F 21/10 726/30 |
| 7,475,124 B2 | 1/2009 | Jiang et al. | | |
| 7,539,813 B1 * | 5/2009 | Todd | .................. | G06F 9/5011 711/108 |
| 8,327,103 B1 | 12/2012 | Can et al. | | |
| 8,380,928 B1 | 2/2013 | Chen et al. | | |
| 8,429,346 B1 | 4/2013 | Chen et al. | | |
| 8,515,911 B1 | 8/2013 | Zhou et al. | | |
| 8,539,148 B1 | 9/2013 | Chen et al. | | |
| 8,566,483 B1 | 10/2013 | Chen et al. | | |
| 8,583,607 B1 | 11/2013 | Chen et al. | | |
| 8,683,153 B1 | 3/2014 | Long et al. | | |
| 8,712,976 B1 | 4/2014 | Chen et al. | | |
| 8,775,388 B1 | 7/2014 | Chen et al. | | |
| 8,782,324 B1 | 7/2014 | Chen et al. | | |
| 8,799,601 B1 | 8/2014 | Chen et al. | | |
| 8,909,887 B1 | 12/2014 | Armangau et al. | | |
| 8,930,746 B1 | 1/2015 | Chen et al. | | |
| 8,954,699 B1 | 2/2015 | Chen et al. | | |

(Continued)

OTHER PUBLICATIONS

U.S. Appl. No. 16/048,767, filed Jul. 30, 2018, Chen et al.

(Continued)

*Primary Examiner* — David Yi
*Assistant Examiner* — Alan Otto
(74) *Attorney, Agent, or Firm* — Daly, Crowley Mofford & Durkee, LLP

(57) ABSTRACT

A method, system and program is described for providing virtual storage domains for content addressable system. At least one tenant data storage policy is configured for at least one tenant in a storage system. A virtual storage domain is created based on the tenant data storage policy, each virtual storage domain having a unique identifier (ID). The corresponding virtual storage domain ID is tagged to a data request based on a data set policy when data belonging to a data set gets written to the storage system. A hash signature is calculated for the data taking the data content and the storage domain ID as inputs to calculate the hash signature.

11 Claims, 4 Drawing Sheets

(56) References Cited

U.S. PATENT DOCUMENTS

| | | | |
|---|---|---|---|
| 8,977,812 | B1 | 3/2015 | Chen et al. |
| 9,152,336 | B1 | 10/2015 | Chen et al. |
| 9,304,889 | B1 | 4/2016 | Chen et al. |
| 9,355,112 | B1 | 5/2016 | Armangau et al. |
| 9,384,206 | B1 | 7/2016 | Bono et al. |
| 9,395,937 | B1 | 7/2016 | Si et al. |
| 9,449,011 | B1 | 9/2016 | Chen et al. |
| 9,459,809 | B1 | 10/2016 | Chen et al. |
| 9,460,102 | B1 | 10/2016 | Bono et al. |
| 9,477,431 | B1 | 10/2016 | Chen et al. |
| 9,513,814 | B1 | 12/2016 | Can et al. |
| 9,529,545 | B1 | 12/2016 | Bono et al. |
| 9,542,125 | B1 | 1/2017 | Chen |
| 9,594,514 | B1 | 3/2017 | Bono et al. |
| 9,684,593 | B1 | 6/2017 | Chen et al. |
| 9,710,187 | B1 | 7/2017 | Si et al. |
| 9,811,288 | B1 | 11/2017 | Chen et al. |
| 9,817,766 | B1 | 11/2017 | Si et al. |
| 10,037,369 | B1 | 7/2018 | Bono et al. |
| 10,082,959 | B1 | 9/2018 | Chen et al. |
| 10,095,428 | B1 | 10/2018 | Meiri et al. |
| 10,152,381 | B1 | 12/2018 | Shvaiger et al. |
| 10,176,046 | B1 | 1/2019 | Hu et al. |
| 10,235,066 | B1 | 3/2019 | Chen et al. |
| 2013/0238571 | A1 | 9/2013 | Bates et al. |
| 2013/0305002 | A1 | 11/2013 | Hallak et al. |
| 2016/0335024 | A1* | 11/2016 | Zhong ............... G06F 3/0605 |
| 2018/0276224 | A1 | 9/2018 | Natanzon |

OTHER PUBLICATIONS

U.S. Appl. No. 16/169,202, filed Oct. 24, 2018, Chen et al.
U.S. Appl. No. 16/177,782, filed Nov. 1, 2018, Hu et al.
U.S. Appl. No. 16/167,858, filed Oct. 23, 2018, Chen et al.
U.S. Appl. No. 16/175,979, filed Oct. 31, 2018, Hu et al.
U.S. Appl. No. 16/157,528, filed Oct. 11, 2018, Chen et al.
U.S. Appl. No. 16/162,786, filed Oct. 17, 2018, Hu et al.
U.S. Appl. No. 16/164,005, filed Oct. 18, 2018, Chen et al.
U.S. Appl. No. 16/264,825, filed Feb. 1, 2019, Chen et al.
U.S. Appl. No. 16/254,899, filed Jan. 23, 2019, Chen et al.
U.S. Appl. No. 16/254,897, filed Jan. 23, 2019, Chen et al.
U.S. Appl. No. 16/264,982, filed Feb. 1, 2019, Chen et al.
U.S. Appl. No. 16/263,414, filed Jan. 31, 2019, Meiri et al.
U.S. Appl. No. 15/076,775, filed Mar. 22, 2016, Chen et al.
U.S. Appl. No. 15/085,188, filed Mar. 30, 2016, Meiri et al.
U.S. Appl. No. 15/499,943, filed Apr. 28, 2017, Kucherov et al.
U.S. Appl. No. 15/499,935, filed Apr. 28, 2017, Chen et al.
U.S. Appl. No. 15/499,949, filed Apr. 28, 2017, Chen et al.
U.S. Appl. No. 15/499,947, filed Apr. 28, 2017, Kucherov et al.
U.S. Appl. No. 15/499,951, filed Apr. 28, 2017, Chen et al.
U.S. Appl. No. 15/656,168, filed Jul. 21, 2017, Hu et al.
U.S. Appl. No. 15/656,170, filed Jul. 21, 2017, Chen et al.
U.S. Appl. No. 15/885,027, filed Jan. 31, 2018, Chen et al.
U.S. Appl. No. 16/042,363, filed Jul. 23, 2018, Chen et al.
U.S. Appl. No. 16/038,543, filed Jul. 18, 2018, Chen et al.
Notice of Allowance dated Apr. 4, 2019 for U.S. Appl. No. 15/885,027; 8 pages.

\* cited by examiner

VIRTUAL STORAGE DOMAIN FOR A CONTENT ADDRESSABLE SYSTEM

BACKGROUND

Computer data is vital to today's organizations, and content addressable storage systems (such as DELL EMC XTREMIO) (hereinafter "XtremIO") can support a rich set of advanced data services such as single data instance, compression, snapshots, etc., by decoupling storage access, logical volume address space, and physical on-disk location of data. In systems such as this, volume and physical layout metadata can offer flexibility in decoupling and virtualization.

In content addressable storage systems (CAS) such as XtremIO, data stored are accessed via unique hash signature generated based on data contents using cryptographic hash functions. For each unique hash signature, the corresponding data only needs to be stored once, since the hash function guarantees that same data always results in the same hash, and a small change to the data would change the hash signature. CAS provides storage efficiency in that only single instance is stored for redundant data. Challenges for such systems can be presented in data usage reporting, security, fault containment, etc., such as in cloud environment where a general storage infrastructure supports diverse needs from multiple applications users and/or tenants. For example, some users may prefer dedicated storage without sharing with others; some users may prefer all their data residing in flash storage for better performance; or some users may use encryption mechanisms to protect their data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Note that each of the different features, techniques, configurations, etc. discussed in this disclosure can be executed independently or in combination. Accordingly, embodiments of the present invention can be embodied and viewed in many different ways. For additional details, elements, and/or possible perspectives (permutations) of the invention, the reader is directed to the Detailed Description section and corresponding figures of the present disclosure as further discussed below.

The invention provides methods and apparatus to allow application and user awareness, or multi-tenancy compliance in a content addressable system. In short, a user can define a set of storage efficiency, performance, and/or security policies. The system may map the policies to virtual storage domains (VSD) each with a unique domain ID. The domain IDs may be added to hash functions when the system calculates hash for incoming data.

One aspect provides a method for providing virtual storage domains for a content addressable system. In one embodiment, the method may include configuring at least one tenant data storage policy for at least one tenant in a storage system. The method further includes creating a virtual storage domain based on the tenant data storage policy, each virtual storage domain having a unique identifier (ID). The method also includes tagging corresponding virtual storage domain IDs to a data request based on a data set policy when data belonging to a data set gets written to the storage system. The method additionally includes calculating a hash signature for the data taking the data content and the storage domain ID as inputs to calculate the hash signature.

Other embodiments may include a computerized device, configured to process all the method operations disclosed herein as embodiments of the invention. In such embodiments, the computerized device includes a memory system, a processor, communications interface in an interconnection mechanism connecting these components. The memory system is encoded with a process that provides virtual storage domains for a content addressable system as explained herein that when performed (e.g. when executing) on the processor, operates as explained herein within the computerized device to perform all of the method embodiments and operations explained herein as embodiments of the invention. Thus, any computerized device that performs or is programmed to perform the processing explained herein is an embodiment of the invention.

Other arrangements of embodiments of the invention that are disclosed herein may include software programs to perform the method embodiment steps and operations summarized above and disclosed in detail below. More particularly, a computer program product is one embodiment may have a computer-readable medium including computer program logic encoded thereon that when performed in a computerized device provides associated operations providing virtual storage domains for a content addressable system as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations may be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

Details relating to this and other embodiments are described more fully herein.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Figure 1:
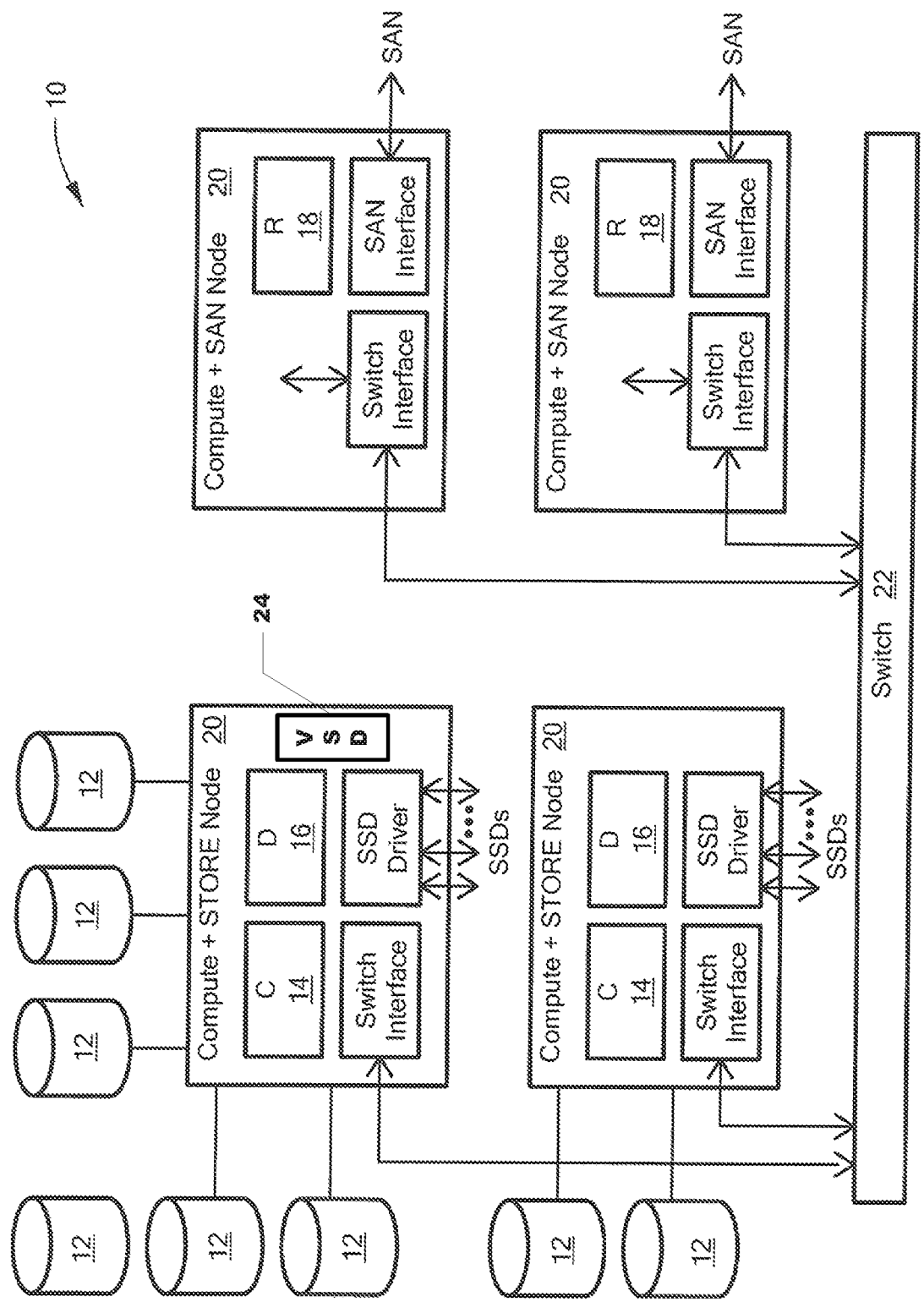
FIG. 1 is a block diagram of a data storage system in accordance with one illustrative embodiment.

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable, and may also be referred to herein as a computer-readable program medium.

The term "deduplication" refers to a technique used to reduce the amount of storage space and communications bandwidth a system uses to store data. Storage systems often contains duplicate copies of many pieces of data. For example, the same file may be saved in several different places by different users, or two or more files that aren't identical may still include much of the same data. Deduplication eliminates these extra copies by saving just one copy of the data and replacing the other copies with pointers that lead back to the original copy. Deduplication is frequently used in backup and disaster recovery applications, but it can be used to free up space in primary storage as well.

In certain embodiments, the term "I/O request" or simply "I/O" or "TO" may be used to refer to an input or output request, such as a data read or data write request.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN) (also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives (e.g., the XtremIO all flash drive, available from DELL/EMC of Hopkinton Mass.). In certain embodiments, a data storage entity may be any one or more of a file system, object storage, a virtualized device, a logical unit, a logical unit number, a logical volume, a logical device, a physical device, and/or a storage medium.

In certain embodiments, a logical unit (LU) may be a logical entity provided by a storage system for accessing data from the storage system, and as used herein a logical unit is used interchangeably with a logical volume. In many embodiments herein, a LU or LUN (logical unit number) may be used interchangeable for each other. In certain embodiments, a LUN may be a logical unit number for identifying a logical unit; may also refer to one or more virtual disks or virtual LUNs, which may correspond to one or more Virtual Machines.

In certain embodiments, a physical storage unit may be a physical entity, such as a disk or an array of disks, for storing data in storage locations that can be accessed by address, where physical storage unit is used interchangeably with physical volume. In certain embodiments, a data storage entity may be any one or more of a file system, object storage, a virtualized device, a logical unit, a logical unit number, a logical volume, a logical device, a physical device, and/or a storage medium.

In certain embodiments, an image may be a copy of a logical storage unit at a specific point in time. In certain embodiments, a clone may be a copy or clone of the image or images, and/or drive or drives of a first location at a second location. In some embodiments, a clone may be made up of a set of objects.

In certain embodiments, a snapshot may refer to differential representations of an image, i.e. the snapshot may have pointers to the original volume, and may point to log volumes for changed locations. In certain embodiments, a snapshot may refer to differential representations of the state of a system. Snapshots may be combined into a snapshot array, which may represent different images over a time period or different states of a system over a time period. In certain embodiments, a snapshot may include one or more dynamic data structures that can include metadata describing user data.

XtremIO, available from Dell EMC of Hopkinton, Mass., is a type of content addressable system array that uses all flash technology. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random I/O data.

At least some embodiments herein are described in connection with a networked memory system that includes multiple memory storage units arranged for content addressable system of data. The data is transferred to and from the storage units using separate data and control planes. Hashing is used for the content addressing, and the hashing produces evenly distributed results over the allowed input range.

Advantageously, the hashing defines the physical addresses so that data storage makes even use of the system resources. Within the networked memory system, a relatively small granularity may be used, for example with a page size of 4 KB, although this is not intended as limiting; smaller or larger block sizes may be selected at the discretion of the skilled person or as application requirements dictate. In certain embodiments herein, the granularity used is one stripe, where one stripe can contain some number of pages or some number of storage block on disk, but this is not limiting.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

Referring to the embodiments of FIG. 1, a data storage system 10 includes a plurality of nodes 20 connected over a network by a switch 22 where the system may map policies to virtual storage domains (VSD) each with a unique domain ID. Also shown is a Virtual Storage domain (VSD) 24. The system 10 includes data storage devices 12 on which data blocks are stored. One or more of data storage devices 12 may be production volumes, which are used by the storage system during processing of IO requests. Each node 20 includes one or more computing modules, such as control modules (C) 14, data modules (D) 16, and routing modules (R) 18. In many embodiments, a given node may include at least one of a routing, control, or data module. In certain embodiments, a node may include a multiplicity of any or all of these modules.

The storage devices 12 are networked to computing modules, including control modules 14 and data modules 16. The control modules 14 control execution of read and write commands. The control modules 14 contain the address to hash mapping table which is the first layer of indirection. Data services such as snapshots, de-duplication, and thin provisioning, are handled in the control modules 14 in example embodiments.

The data modules 16 are connected to the storage devices 12 and, under control of a respective control module 14, pass data to or from the storage devices 12. The data modules 16 contain the hash to physical (H2P) Solid State Drive (SSD) address mapping. The data modules 16 are also responsible for IO operations to the SSDs themselves, as well as managing the data protection scheme. In a particular embodiment the data module may include a plurality of counters 28.

Routing modules 18 route processing throughout the system 10. In some embodiments, routing modules may terminate storage and retrieval operations and distribute command parts of any operations to control modules that are explicitly selected for the operation in such a way as to retain balanced usage within the system.

In certain embodiments, the computing modules (e.g., data, control, and/or routing modules) may include executable computer code configure to perform processing described below in conjunction with FIG. 3. In many embodiments, each node runs multiple processes in parallel.

In some embodiments, the computing modules may carry out content addressing for storage and retrieval. In certain embodiments, control and data modules may retain extracts of the data stored in the storage device, and the extracts may be used for the content addressing. In many embodiments, the extracts may be computed by cryptographic hashing of the data, e.g., the modules may calculate hash values for data that are the subject of I/O commands, and the hash values may later be used for retrieval. In particular embodiments, hashing used for the content addressing produces evenly distributed results over the allowed input range. The hashing defines the physical addresses so that data storage makes even use of the system resources.

In certain embodiments, data is stored in blocks, where each block has a unique hash signature. In some embodiments, relatively small granularity may be used for blocks, for example with a block size of 4 KB, although smaller or larger block sizes may be selected. In many embodiments, a user I/O request larger than 4 KB or other system-determined block size may be converted into a plurality of I/O operations within the system, each one separately hashed and separately processed.

In particular embodiments, data blocks are stored to solid-state disks (SSDs). In some embodiments, a data storage system is a flash-based key/value cluster storage array. In some embodiments, the storage devices may include solid-state random access storage devices. In other embodiments, the storage devices may include spinning disk devices.

In some embodiments, a content addressable system (CAS) can be used to ensure that data appearing twice is stored at the same location (e.g., to identity and avoid duplicate write operations). In many embodiments, CAS can be used to provide de-duplication within a data storage system, ensuring that the same data is not stored twice in different places.

In some embodiments, the separation of control and data may enable a substantially unlimited level of scalability, since control operations can be split over any number of processing elements, and data operations can be split over any number of data storage elements. In many embodiments, the separation of control and data may provide one or more of the following: (a) parallel operation of certain control and data actions over multiple nodes/modules; (b) use of optimal internal communication/networking technologies per the type of operation (control or data), designed to minimize the latency (delay) and maximize the throughput of each type of operation.

In many embodiments, routing modules may use hash values, calculated from data associated with the operations, to select the control module for the distribution. In certain embodiments, a control module may be selected based on a user-specified address. In many embodiments, the hash value may be used for selecting the data module, and for setting the physical location for data storage within the data module. In some embodiments, the routing modules and/or data modules may provide deduplication by comparing the extracts or hash values of write data with hash values of already stored data, and where a match is found, simply point to the matched data and avoid rewriting.

In various embodiments, a routing modules may decouple data storage patterns from I/O patterns. In some embodiments, a routing module may break up incoming blocks that are larger than a given granularity size and send the relevant parts to the appropriate control modules. In many embodiments, a control module may handle a range or set of addresses within a logical unit (LU). In particular embodiments, a control module may break up a block it receives for distribution to data modules, at a pre-determined granularity. In one embodiment, a request to write a sixty-four (64) KB block may end up being broken up into sixteen (16) internal writes, each write comprising a four (4) KB block.

Embodiments provide virtual storage domains for content addressable system enabling single instance storage at a finer granularity at storage domain level, as opposed to at an entire system level. Users may configure tenant data storage policies for data streams or application data, which could include but are not limited to shared/exclusive storage, data protection level, encryption policy, storage tiers, etc.

In embodiments, the storage system creates virtual storage domains based on the data set policy, with domain IDs unique for each domain. If two policies allow data sets to be shared together, they are allowed in the same storage domain and thus assigned the same domain ID, otherwise, the data sets will be in different domains.

When data belonging to a certain set gets written to the storage system, the policy engine tags the corresponding domain ID to the data request based on the data set policy.

Hash function in the system takes both the data content and the domain ID as input to calculate hash signatures for the data. The same data in different domains will be assigned different hash signatures, and thus stored in different physical locations. The system could also look at tagged domain ID of data, and allocates physical data location from different storage tiers of a given storage domain.

When user retrieves data, the policy engine looks up the domain ID first based on the policy and then sends the data read request tagged with domain ID. Data access isolation and performance may then be achieved within a domain boundary.

Since the storage domains are virtually created, data are allowed to move in between domains. This can be done via choosing hash functions, and rehashing data that needs to be moved, duplicated, etc. Similarly, domains may also be split or merged with policy configuration changes.

Figure 2:
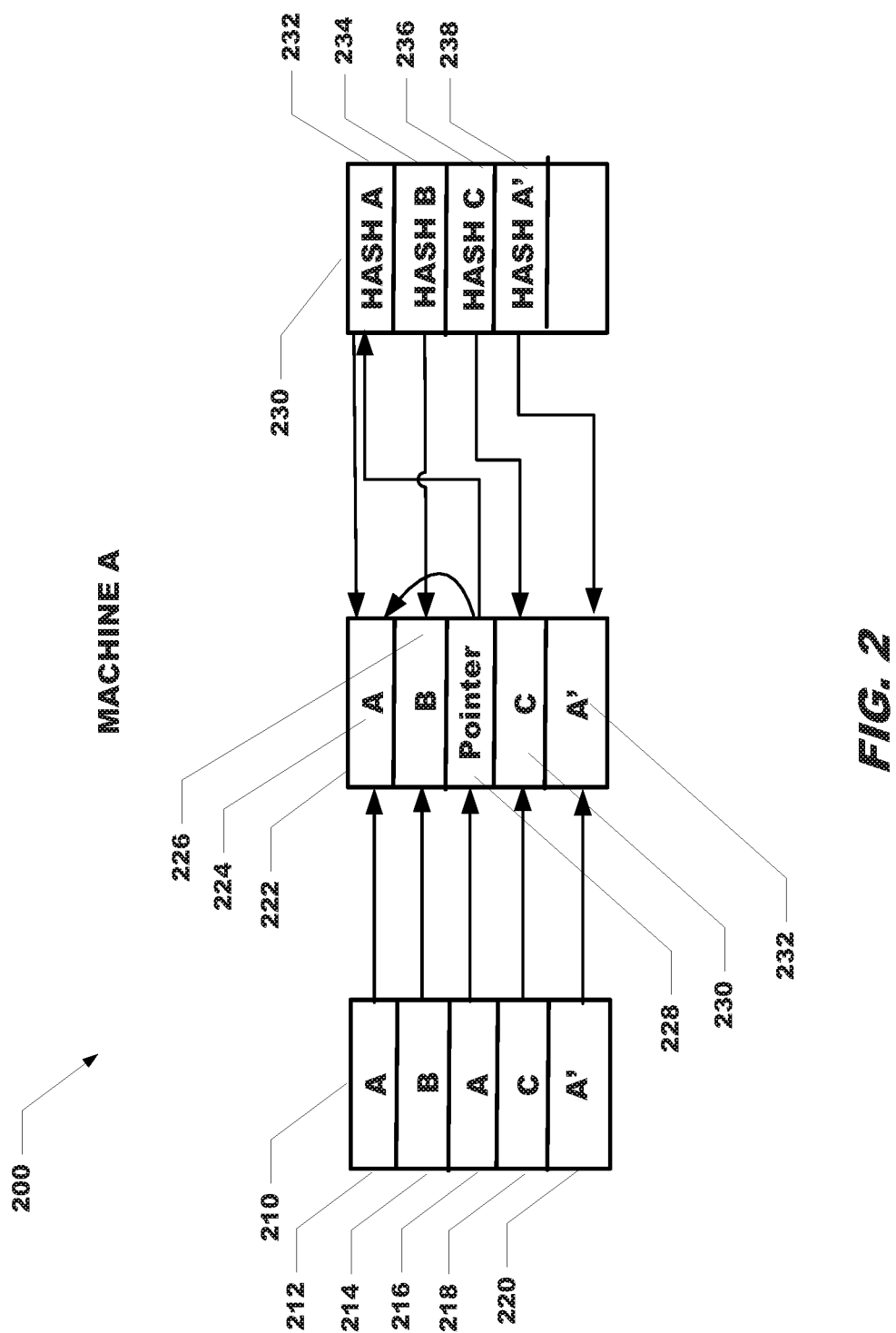
FIG. 2 is a diagram illustrating an example data layout for storage devices, in accordance with illustrative embodiments.

Referring now to FIG. 2, an environment 200 for providing virtual storage domains for a content addressable system is shown. A storage device 210, receives data and stores data. As shown in storage device 210, the storage device has received data A and stored it in location 212. Data A 212 is associated with a first policy. Storage device 210 has received data B and stored it in location 214. Storage device 210 has received data A (same data as in location 210 and associated with the same policy) and stored it in location 216. Storage device 210 has received data C and stored it in location 218. Storage device 210 has received data A' (same data as in location 212 and 216 but is associated with a second storage policy that is different than the first policy) and stored it in location 220.

Storage device 222 is configured for performing deduplication and storage. Initially the deduplication device 222 does not have any data stored thereon. As shown in storage device 222, the device has received data A and checks to see if the storage array that device 222 is on already has a copy of data A stored thereon. The storage array device 222, at this time, does not have a copy of data A stored thereon, so the deduplication device 222 stores data A in location 224. Deduplication device 222 has received data B and again checks to see there is an existing copy of data B. The storage array deduplication device 222 doesn't have a pre-existing copy of data B, so deduplication device 222 stores data B in location 226. Deduplication device 222 has received data A from location 216 and checks to see if there is an existing copy of data A on the deduplication device. The storage array deduplication device 232 does have a copy of data A already stored thereon (location 224), so instead of duplicating the data by storing data A again at location 228, instead deduplication device stores a pointer to location 224 which contains data A. Deduplication device 222 has received data C and checks to see if there is an existing copy of data C on the array. The array deduplication device 222 doesn't have a copy of data C previously stored on the device, so data C is stored in location 230. Duplication device 222 has received data A from location 220 and checks to see if there is an existing copy of data A on the array. The array deduplication device 222 does have a copy of data A but data A is associated with a different data policy which is associated with a virtual storage domain, so instead of storing a pointer to location 224 which contains data A, this data (referred to as data A') is stored in location 232.

In one example, a pointer may require only twenty bytes of data, whereas a data block may require eight kilobytes of storage. Since a pointer takes up much less space than a regular data block entry, significant storage space is saved by the deduplication methodology. As shown, deduplication results in storing the data once and storing a pointer for other occurrences of the same data.

Hash table 230 shows the hash value for each data entry. Hash A 232 is a hash of data A in location 224, hash B 234 is a hash of data B at location 226, and Hash C has a hash of data C in location 236, and hash A' is stored in location 238. The pointers also point to the corresponding hash in the hash table. For example, the pointer at location 228 also points to HASH A in location 232 of hash table 230. The hash table entries also point to the corresponding data stored on the deduplication device 222. In this manner if data A is moved, the pointers in locations 228 and 232 still point to the hash of A. In such a manner, an additional layer of granularity is used for storing data wherein the data policy is used to distinguish similar data within a storage system.

Figure 3:
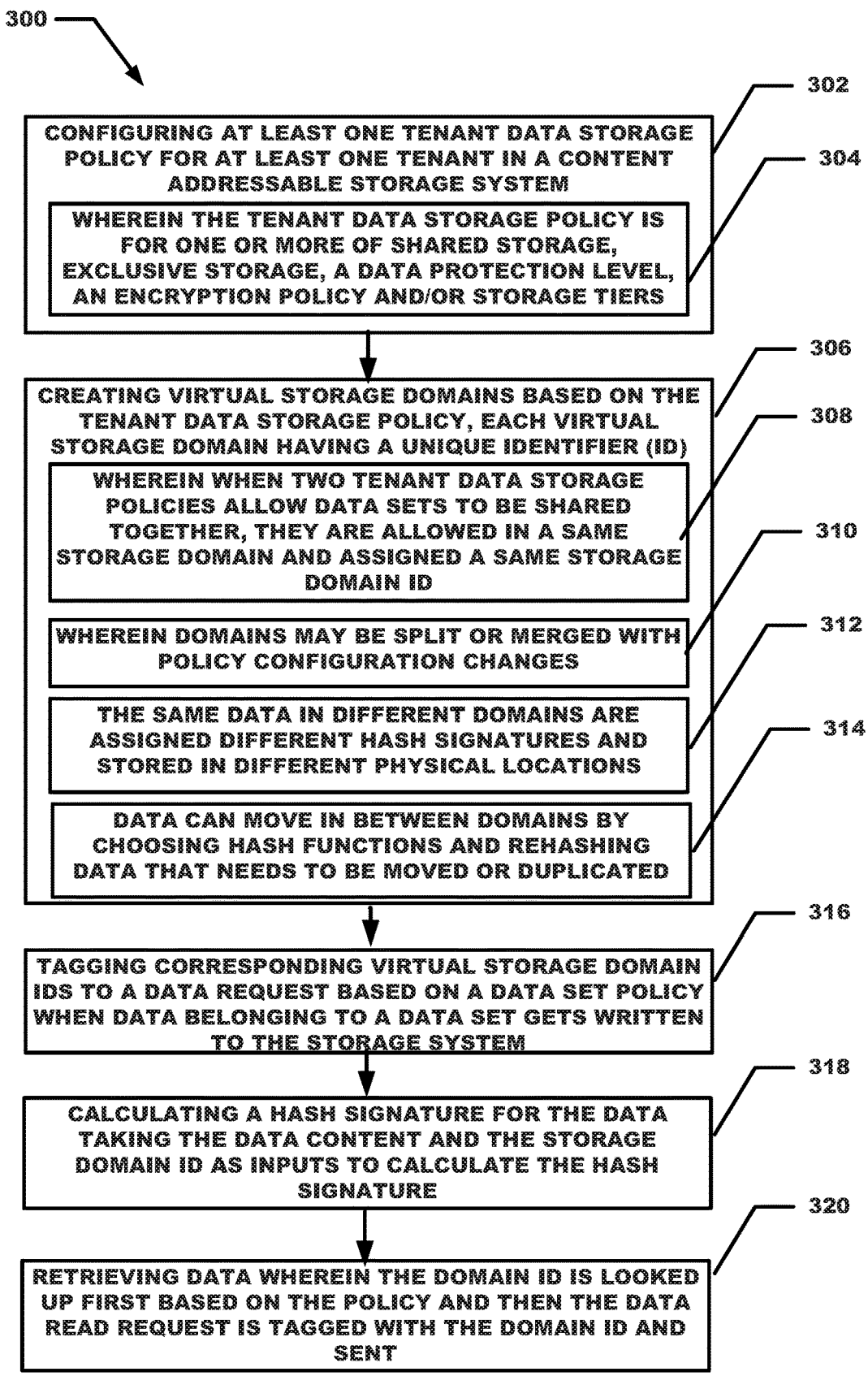
FIG. 3 is a flow chart of an illustrative process providing virtual storage domains for a content addressable memory.

Referring now to FIG. 3 a particular embodiment of a method providing virtual storage domains in a content addressable system is shown. Rectangular elements, herein denoted "processing blocks," represent computer software instructions or groups of instructions. Alternatively, the processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Further, the processes and operations described herein can be performed by a computer especially configured for the desired purpose or by a general-purpose computer especially configured for the desired purpose by another computer program stored in a computer readable storage medium or in memory.

Referring to FIG. 3, a particular embodiment t of a method 300 for providing virtual storage domains for a content addressable system is shown. The method 300 begins with processing block 302 which shows configuring at least one tenant data storage policy for at least one tenant in a content addressable storage system. Different tenants may have different storage policies. As shown in processing block 304 a tenant data storage policy may be for one or more of shared storage, exclusive storage, a data protection level, an encryption policy and/or storage tiers.

Processing block 306 discloses creating virtual storage domains based on the tenant data storage policy, each virtual storage domain having a unique identifier (ID). As shown in processing block 308 when two tenant data storage policies allow data sets to be shared together, they are allowed in a same storage domain and assigned a same storage domain ID. Processing block 310 shows that domains may be split or merged with policy configuration changes. Processing block 312 discloses wherein the same data in different domains are assigned different hash signatures and stored in different physical locations. Processing block 314 recites data can move in between domains by choosing hash functions and rehashing data that needs to be moved or duplicated.

Processing block 316 shows tagging corresponding virtual storage domain IDs to a data request based on a data set policy when data belonging to a data set gets written to the storage system.

Processing block 318 discloses calculating a hash signature for the data taking the data content and the storage domain ID as inputs to calculate the hash signature.

Processing block 320 recites retrieving data wherein the domain ID is looked up first based on the policy and then the data read request is tagged with the domain ID and sent.

Figure 4:
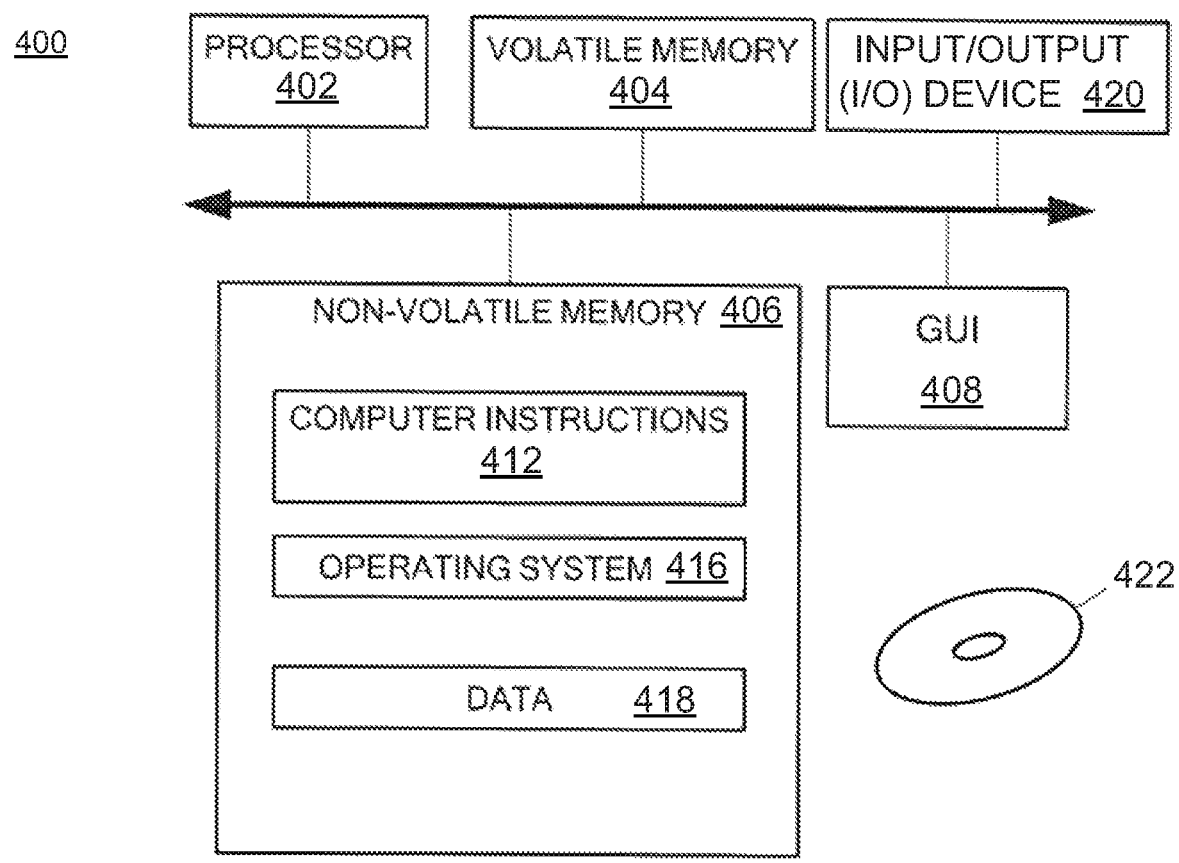
FIG. 4 is a block diagram of an example of a hardware device that may perform at least a portion of the process depicted in the flow chart.

As shown in FIG. 4, computer 400 may include processor 402, volatile memory 404 (e.g., RAM), non-volatile memory 406 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 408 (e.g., a touchscreen, a display, and so forth) and input and/or output (I/O) device 420 (e.g., a mouse, a keyboard, etc.). In certain embodiments, the computer instructions 412 are executed by the processor/CPU 402 out of volatile memory 404 to perform at least a portion of the processes shown in FIG. 3. Program code also may be applied to data entered using an input device or GUI 408 or received from I/O device 420.

The processes of FIG. 3 is not limited to use with the hardware and software described and illustrated herein and may find applicability in any computing or processing environment and with any type of machine or set of machines that may be capable of running a computer program. The processes described herein may be implemented in hardware, software, or a combination of the two. The logic for carrying out the method may be embodied as part of the system described in FIG. 4, which is useful for carrying out a method described with reference to embodiments shown in, for example, FIG. 3. The processes described herein are not limited to the specific embodiments described. For example, the processes of FIG. 3 are not limited to the specific processing order shown in FIG. 3. Rather, any of the blocks of the processes may be re-ordered, combined, or removed, performed in parallel or in serial, as necessary, to achieve the results set forth herein.

Processor 402 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A processor may perform the function, operation, or sequence of operations using digital values or using analog signals. In some embodiments, the processor can be embodied in one or more application specific integrated circuits (ASICs). In some embodiments, the processor may be embodied in one or more microprocessors with associated program memory. In some embodiments, the processor may be embodied in one or more discrete electronic circuits. The processor may be analog, digital, or mixed-signal. In some embodiments, the processor may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general-purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

For example, when the program code is loaded into and executed by a machine, such as the computer of FIG. 4, the machine becomes an apparatus for practicing the invention. When implemented on one or more general-purpose processors, the program code combines with such a processor to provide a unique apparatus that operates analogously to specific logic circuits. As such a general-purpose digital machine can be transformed into a special purpose digital machine.

FIG. 4 shows program logic embodied on a computer-readable medium 422 as shown, and wherein the logic is encoded in computer-executable code configured for carrying out the process of providing virtual storage domain for content addressable system invention and thereby forming a computer program product. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, the storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

For purposes of illustrating the present embodiment, the disclosed embodiments are described as embodied in a specific configuration and using special logical arrangements, but one skilled in the art will appreciate that the device is not limited to the specific configuration but rather only by the claims included with this specification.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A computer-implemented method comprising:
configuring at least one tenant data storage policy for at least one tenant in a content addressable system;
creating virtual storage domains based on the tenant data storage policy, each virtual storage domain having a unique identifier (ID);
tagging corresponding virtual storage domain IDs to a data request based on a data set policy when data belonging to a data set gets written to the content addressable storage system;
calculating a hash signature from the data content and the virtual storage domain ID, the data content and the virtual storage domain ID provided as inputs to a hash function that calculates the hash signature such that, when two tenant data storage policies allow data sets to be shared together, same data allowed in a same storage domain are assigned a same hash signature and stored once in a single physical location with pointers to the single physical location being stored for other occurrences of the same data in the same storage domain, and such that the same data in different domains are assigned different hash signatures and stored in different physical locations; and
responsive to a data read request,
looking up a domain ID based on the policy;
tagging the data read request with the domain ID; and
sending the data read request tagged with the domain ID for processing of the data read request, wherein the data and the domain ID is used to calculate a hash signature for use in retrieving the requested data.

2. The method of claim 1, wherein the tenant data storage policy is for one or more of shared storage, exclusive storage, a data protection level, an encryption policy and/or storage tiers.

3. The method of claim 1, wherein domains may be split or merged with policy configuration changes.

4. The method of claim 1, wherein data can move in between domains by choosing hash functions and rehashing data that needs to be moved or duplicated.

5. A system, comprising;
a processor; and
a non-volatile memory in operable communication with the processor and storing computer program code that when executed on the processor causes the processor to execute a process operable to perform the operations of:
configuring at least one tenant data storage policy for at least one tenant in a content addressable storage system;
creating virtual storage domains based on the tenant data storage policy, each virtual storage domain having a unique identifier (ID);
tagging corresponding virtual storage domain IDs to a data request based on a data set policy when data belonging to a data set gets written to the content addressable storage system;
calculating a hash signature from the data content and the virtual storage domain ID, the data content and the virtual storage domain ID provided as inputs to a hash function that calculates the hash signature such that, when two tenant data storage policies allow data sets to be shared together, same data allowed in a same storage domain are assigned a same hash signature and stored once in a single physical location with pointers to the single physical location being stored for other occurrences of the same data in the same storage domain, and such that the same data in different domains are assigned different hash signatures and stored in different physical locations; and
responsive to a data read request,
looking up a domain ID based on the policy;
tagging the data read request with the domain ID; and
sending the data read request tagged with the domain ID for processing of the data read request, wherein the data and the domain ID is used to calculate a hash signature for use in retrieving the requested data.

6. The system of claim 5, wherein the tenant data storage policy is for one or more of shared storage, exclusive storage, a data protection level, an encryption policy and/or storage tiers.

7. The system of claim 5, wherein domains may be split or merged with policy configuration changes.

8. The system of claim 5, wherein data can move in between domains by choosing hash functions and rehashing data that needs to be moved or duplicated.

9. A computer program product including a non-transitory computer readable storage medium having computer program code encoded thereon that when executed on a processor of a computer causes the computer to operate a storage system, the computer program product comprising:
computer program code for configuring at least one tenant data storage policy for at least one tenant in a content addressable storage system;

computer program code for creating virtual storage domains based on the tenant data storage policy, each virtual storage domain having a unique identifier (ID);

computer program code for tagging corresponding virtual storage domain IDs to a data request based on a data set policy when data belonging to a data set gets written to the content addressable storage system;

computer program code for calculating a hash signature from the data content and the virtual storage domain ID, the data content and the virtual storage domain ID provided as inputs to a hash function that calculates the hash signature such that, when two tenant data storage policies allow data sets to be shared together, same data allowed in a same storage domain are assigned a same hash signature and stored once in a single physical location with pointers to the single physical location being stored for other occurrences of the same data in the same storage domain, and such that the same data in different domains are assigned different hash signatures and stored in different physical locations; and computer program code for, responsive to a data read request,
looking up a domain ID based on the policy;
tagging the data read request with the domain ID; and
sending the data read request tagged with the domain ID for processing of the data read request, wherein the data and the domain ID is used to calculate a hash signature for use in retrieving the requested data.

10. The computer program product of claim 9, wherein the tenant data storage policy is for one or more of shared storage, exclusive storage, a data protection level, an encryption policy and/or storage tiers.

11. The computer program product of claim 9, wherein domains may be split or merged with policy configuration changes.

\* \* \* \* \*